US005540485A

United States Patent [19]
Enders

[11] Patent Number: 5,540,485
[45] Date of Patent: Jul. 30, 1996

[54] COMPOSITE BICYCLE WHEEL

[76] Inventor: Mark L. Enders, 3253 N. 750 E., North Ogden, Utah 84404

[21] Appl. No.: 337,175

[22] Filed: Nov. 10, 1994

[51] Int. Cl.⁶ .................................. B60B 5/02; B60B 1/00
[52] U.S. Cl. ................................. 301/104; 301/64.7
[58] Field of Search ............................. 301/64.1, 64.3, 301/64.7, 104, 95

[56] References Cited

U.S. PATENT DOCUMENTS

| | | | |
|---|---|---|---|
| 1,299,360 | 4/1919 | Ledwinka | 301/64.1 |
| 4,573,745 | 3/1986 | Fujisaki et al. | 301/64.7 |
| 4,919,490 | 4/1990 | Hopkins et al. | 301/63 |
| 4,930,843 | 6/1990 | Lewis | 301/104 X |
| 5,104,199 | 4/1992 | Schlanger | 301/63 |
| 5,246,275 | 9/1993 | Arredondo, Jr. | 301/64.7 |

Primary Examiner—Russell D. Stormer
Attorney, Agent, or Firm—A. Ray Osburn

[57] ABSTRACT

A bicycle wheel with composite fiber resin spoke and rim structures having opposing spokes radiating from a central hub, the spokes being filament wound continuously one to the other across the central hub. The configuration provides for lower resistance to lateral wind, and for light weight resulting from the use of composite structures with fibers substantially oriented to resist wheel loads.

29 Claims, 8 Drawing Sheets

COMPOSITE BICYCLE WHEEL

BACKGROUND OF THE INVENTION

1. Field

The present invention relates to bicycle wheels constructed of composite materials and to associated methods of manufacture. More particularly, the invention relates to bicycle wheels made from fibers impregnated with synthetic resins, and methods for fabricating such wheels.

2. State of the Art

Typically, bicycle wheels have been constructed to include an outer rim shaped to accept a pneumatic tire, joined with a central hub structure by a multiplicity of metal wire spokes. As the interest in bicycle riding has increased, both at the amateur and professional sports level and at the recreation and exercise level for others, the interest in the use of plastics to reduce the weight and the aerodynamic drag of the bicycle components has kept pace. Composite structures exhibit high strength to weight ratio, making them desirable for human powered vehicles such as bicycles. These composite materials are composed of fibers impregnated with a synthetic resin. The fibers, for example, could be carbon, Kevlar® or thermoplastics such as polyamides or polyethylene. The synthetic resin matrix could be either of thermosets such as epoxies, polyesters or the thermoplastics, including many polymers. The composite material forms used in the prior art have typically been woven cloth and/or unidirectional tape.

Several bicycle frame producers have developed lightweight frames with good strength, but the degree of improvement has in general not occurred with bicycle wheels. However, the disc wheel may be considered an exception, wherein the wheel comprises two molded inwardly facing concave composite discs sandwiching a core of honeycomb material or plastic foam, in turn attached to the hub and a tire receiving rim. The resulting wheel structure is aerodynamically efficient in straight on winds, but weighs more than conventional wire spoked wheels.

Bicycles wheels must be stiff both laterally and radially. Low lateral stiffness potentially causes the wheel to flex excessively, increasing bicycle control problems, in the worst case increasing the likelihood of rim collapse. Radial stiffness is required to resist the vertical forces, including shock loads, without excessive deflection. Wheel flexing taxes the rider's energy, as well as decreases the pleasure of riding. Thus, the need exists for lightweight stiff wheels which also minimize resistance to side winds. It seems mandatory to replace the disc wheel with a wheel allowing side winds to pass more or less freely therethrough. In other words, a spoked wheel composite plastic construction offers definite benefit.

Several composite bicycle designs have been proposed since the inception of the disc wheel to improve wheel weight and lateral aerodynamics. In U.S. Pat. No. 4,919,490, lateral aerodynamics are improved by use of a three spoked composite wheel. The spokes have a cross sectional shape of an airfoil. The entire wheel structure is handlaid with composite cloth, and is resin injection molded with an outermost metal tire receiving rim. The resulting wheel has improved lateral aerodynamics, but is still relatively heavy and expensive even in comparison with conventional wheels. U.S. Pat. No. 5,246,275 discloses a similar, but three spoked, composite wheel structure. In this case, the composite structure is hollow, without any internal foam or honeycomb. The hollow structured wheel is lighter, but at the expense of costly hand lay up manufacturing methods. In U.S. Pat. No. 5,104,199, a composite four spoked wheel is disclosed which essentially comprises a disc wheel design without the core material and with large portions of the discs cut away to form the spokes. This design has good lateral aerodynamics, light weight and a simplified method of manufacture. However, the lateral stiffness of the wheel is compromised. Each spoke comprises a pair of thin walled composite plates with little buckling load resistance, making it difficult to achieve acceptable radial and lateral stiffness.

Typically, these prior art wheels are all constructed by hand laying up of plies of fiber reinforced plastic cloth, either upon a male mandrel or upon the inside surface of a pair of split mold halves. The laid up structure is subsequently compressed by internal or external pressure respectively. Heat is applied in some instances, depending on the selected resin matrix. The use of laid up cloth materials makes it very difficult to select fiber orientation to most efficiently and directly resist the spoke and wheel loads. The use of hand laid cloth materials makes it impossible to achieve a low cost method of manufacture.

Accordingly, all the prior art design approaches leave something to be desired structurally. Still needed is a novel bicycle wheel construction which utilizes the strength of the composite reinforcing fibers of plastic in the most efficient manner to reduce bicycle and wheel weight as much as possible.

BRIEF SUMMARY OF THE INVENTION

With the foregoing in mind, this invention comprises a bicycle wheel having a central hub with an axial bore therethrough adapted to receive a gear and axle assembly. Joining the hub are at least two pairs of radially opposed spoke structures of composite material. Two pairs are preferred, to avoid excessive blockage of side winds. The radially opposed spokes of each pair are constructed of windings of composite fibers continuously from one tip of one of the spokes, past the hub, to and around the tip of the other spoke. Thus, each pair of radial spokes is an integral structure of shared continuous filaments. The opposite, perpendicular, pair is similarly constructed, its continuous filaments crossing those of the first wound pair at the hub.

For spoke winding, an internal inflatable spoke mandrel assembly is utilized, shaped to conform to the desired inside surface of the spoke structure. Preferably, the mandrel assembly comprises an individual internal mandrel for each spoke, externally shaped to match fit the hub and to each other. The assembled spoke mandrel and hub is then engaged at one of the pairs of opposing tips by the soft jaw clamps of a filament winding machine. Filament winding is a well known composite manufacturing process comprising the winding of fibrous materials on to a revolving mandrel. The materials used are continuous fibers such as carbon, Kevlar® glass, Nylon or Polyethylene. In a wet wind process, a dry fiber is impregnated with resin during winding. Or, a pre-impregnated composite material may be used. In another process the resin is injected into the fibers during molding. Multiple bundles of carbon fibers make up a "tow" for winding, or a "roving" for glass. Filament winding can use multiple tows (more than one) to make up a "band". The band is similar to a continuous tape, but the individual tows within the band are allowed to move at different speeds during the winding process, which alleviates the problems of wrinkling during tape winding. Filament winding is a highly automated process of placing fiber into composite materials in a pre-determined orientation. Simple multiaxis filament winding machines are capable of winding the spoke and wheel geometries needed for this invention.

The filament band is wound in a pattern about the perpendicularly extending other pair of spoke mandrels. The band, as it is wound, is directed to pass longitudinally along the spokes and past the central hub on successive rotations of the spoke hub mandrel assembly. Upon completion of winding of the first pair of spokes, the mandrel is secured into the winding machine by the soft jaw clamps, which now grip the tips of the initially wound pair of spokes. The remaining pair of spokes is then filament wound in the same manner, over the filaments already wound across the hub. The same pattern is used for both spoke pairs. This completes the integrated spoke inflatable mandrel-hub structure, preparatory to its insertion between a pair of split female molds defining the shape of its outer surface. However, said female molds are also configured to accept an inner rim structure and an outer rim structure, the latter of metallic or composite material. In accordance with another embodiment, the inner and outer rims are replaced by a single composite structure.

A strong, lightweight rim structure must be provided to transfer road loads to the spokes. In a preferred embodiment, it comprises an inner rim of composite material joining with the tips of the integrated spoke mandrel-hub structure. Joining with the radially outermost surface of the inner rim is a metallic rim adapted to accept a bicycle pneumatic tire.

In this embodiment, the composite inner rim is in cross section a box-like structure, constructed as follows. The filament spoke-mandrel-hub assembly is placed between a pair of female molds which extend radially beyond the spoke tips. Strips of composite reinforced cloth or unidirectional tape are then inserted over the tip ends of the spoke assembly to compensate for any reduced wall thickness at the outer edge of the filament wound part, where the filaments are relatively far apart. An elongate strip of composite cloth is then laid all around the mold, across the tip reinforcing short strips and upon the molds between the spokes, forced generally into an outwardly opening "U" shape. Between spokes, the molds are shaped to receive the cloth strips. Continuous fiber filament hoops are then wound upon the bottom of the "U" shaped cloth strip, forcing it to bear closely upon the compensating strips covering the outer surface of the spoke tips. An inner tube shaped, toroidal inflatable inner rim bladder is placed between the mold flanges about the inner rim hoop windings. Subsequently, radially extending edges of the cloth strip are folded over the toroidal bladder to form an uncured box-like structure therearound.

At this point, the female molds are disconnected from each other, and one removed to allow installation of the continuous metallic outer rim about the outside of the inner rim cloth. Alternately, to avoid complete disassembly of the molds, an annular circumferential portion of one of the halves may be constructed to be removable. With either approach, the molds are then reassembled and, if desired, hoop windings are applied about the bottom of the metallic rim about the wheel.

To complete wheel fabrication, the toroidal rim bladder and filament wound spoke inflatable mandrel assembly are both inflated within the opposed female molds. After an appropriate cure cycle, the completed integrated wheel structure is removed from the mold.

In another preferred embodiment, the outer rim, as well as the inner rim, is of composite construction, formed within female molds about another toroidal bladder, and cured along with the inner rim and spoke structure.

In still another preferred embodiment, the inner and outer rims are replaced by a single composite box-like structure adapted to receive a tire on its outermost circumference. Again, this rim structure is cured within female molds along with the spoke structures.

The fibrous materials in these wheel structures are oriented aligned with the principal loads of the bicycle wheel. The resulting composite wheel structure of the invention achieves the principal objectives of the invention, which are reduced aerodynamic resistance to side wind, increased strength, lower weight and reduced manufacturing costs.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
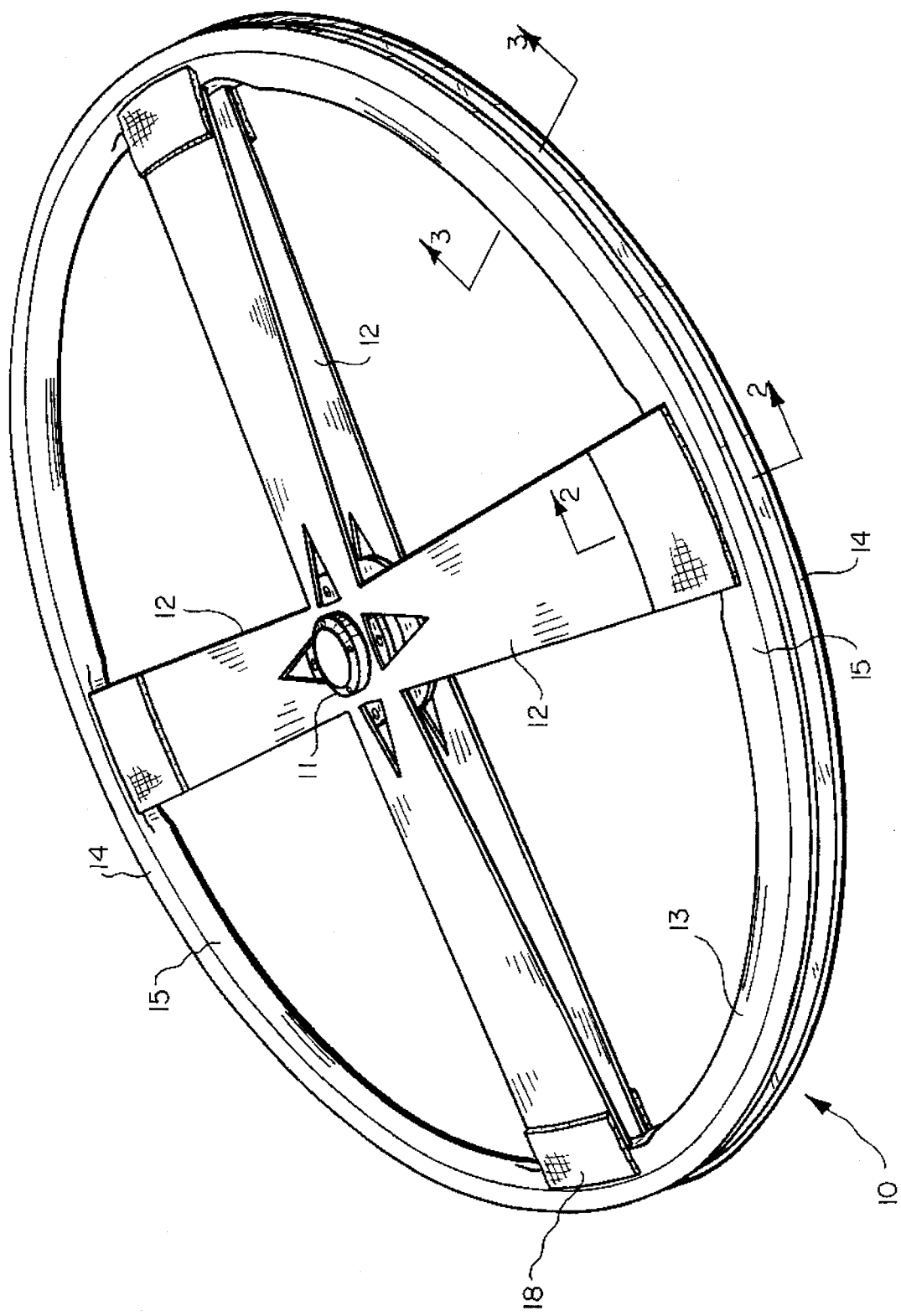
FIG. 1 is a perspective view of a bicycle wheel in accordance with the invention, drawn to a reduced scale, FIG. 2 a cross sectional view of a fragment of the wheel of FIG. 1, taken along line 2—2 thereof, drawn substantially full scale, FIG. 3 a cross sectional view of the rim structure of FIG. 1, taken along line 3—3 thereof, drawn to the scale of FIG. 2, FIG. 4 a perspective view of the individual inflatable spoke mandrel of the invention, drawn to a reduced scale, FIG. 5 a cross sectional view of a fragment of the hub of the wheel of the invention secured to a fragment of an individual spoke mandrel of the invention, drawn to a reduced scale, FIG. 6 a cross sectional view of a fragment of the wheel of the invention showing a fragment of the hub thereof and attached fragments of an inflatable spoke bladder and composite walls of a spoke, with an associated gear and axle assembly, fragmentally shown, drawn to substantially full scale, FIG. 7 a perspective view of an assembled spoke mandrel-hub assembly, indicated as being clamped into a filament winding machine, drawn to a somewhat smaller scale than that of FIG. 1, FIG. 8 a schematic indication of the continuous band filament windings upon directly opposed pairs of spoke mandrels, drawn as if said mandrels were transparent, drawn to approximately the scale of FIG. 7, FIG. 9 an indication of the filament band windings of the perpendicular pairs of spoke mandrels, with said bands crossing in the hub areas, drawn approximately to the scale of FIG. 7, FIG. 10 a cross sectional view of a fragment of a split female mold assembly, installed about a fragment of one of the spoke mandrel tips, with inner rim forming bladder and composite cloth indicated in an intermediate position, drawn to approximately full scale, FIG. 11 a fragment of the female split mold assembled about a fragment of an individual spoke mandrel with filament windings thereon, an inner rim structure of folded composite cloth about the mandrel, and an outermost metallic rim, in condition for cure, drawn to the scale of FIG. 10, FIG. 12 a cross sectional view of a fragment of the wheel of the invention installed within a fragment of a split female mold of the invention, showing the central hub structure, the individual spoke mandrel, and composite windings thereon, and an individual spoke mandrel pressure injection port and associated needle and pressure supply hose, drawn to substantially full scale, FIG. 13 a cross sectional view of one of the radial spokes of one embodiment of the wheel of the invention, showing an aerodynamically tapered shape, with a spoke mandrel remaining therewithin and having convex forward and trailing edge swatches for aerodynamic performance, drawn to somewhat larger than actual scale, FIG. 14 a cross sectional view of a spoke of the invention having parallel side members, with retained spoke mandrel, drawn to the scale of FIG. 13, FIG. 15 a cross sectional view of one of the spokes of a wheel in accordance with the invention, wherein the spoke mandrel has been removed, drawn to the scale of FIG. 13, FIG. 16 a cross sectional view of a section of the rim of a wheel in accordance with the invention, having a composite outer rim structure, drawn to approximately full scale, FIG. 17 a cross sectional view taken through the rim of a wheel in accordance with the invention between the spokes thereof, having a single composite structure instead of separate inner and outer rim structures, drawn to the scale of FIG. 16, and FIG. 18 a cross sectional view of a fragment of a wheel in accordance with the invention, taken through a spoke tip and rim structure thereof, having a single composite rim structure, with the outer circumference thereof adapted to accept a tire, drawn to the scale of FIG. 17.

A composite bicycle wheel 10 in accordance with the invention comprises a central hub 11, preferably of aluminum alloy metal, from which radiate two pairs of directly opposed composite spoke structures 12, the pairs being perpendicular to each other at the hub. The composite is a fibrous material impregnated with a synthetic plastic resin. (FIG. 1) Each spoke structure 12 extends to a circular rim assembly 13 having an outermost, metallic rim 14 for receiving a tire and tube assembly therearound, not shown. An inner rim 15 of hollow composite construction joins with the bottom surface 16 of outer rim 14. (FIGS. 2 & 3) Composite cloth swatches 18 bridge the junctures of spokes 12 and inner rim 15 on both sides of the wheel, bonded with the outer surfaces of both.

Figure 2:
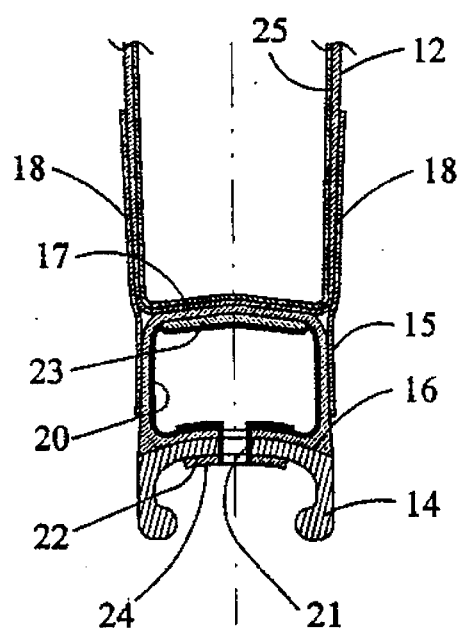
Figure 3:
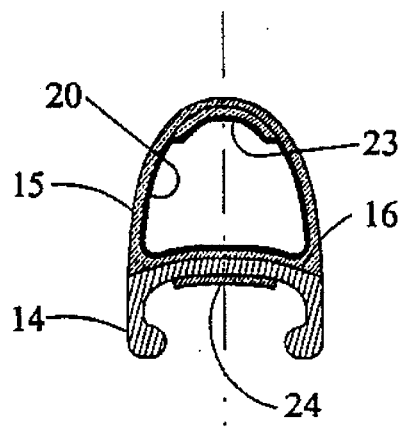

FIGS. 2 and 3 respectively illustrate, in cross section, rim assembly 13 at the spoke tips 17 and between the spokes 12. The box-like shape of the composite inner rim 15 at the spoke tips 17 transitions smoothly from each spoke tip edge to an oval streamlined shape between the spokes 12. (FIG. 3) Finished rim 13 comprises the box-like inner rim composite structure 15 bonded to the inward facing surface 16 of metallic outer rim 14. An inflatable inner rim bladder 20 used during cure of inner rim 15 remains within the finished structure. The bladder pressurizing stem 21 is shown in FIG. 2 trimmed flush with the outside surface of composite hoop windings 24.

Strengthening inner rim hoop filament windings 23 are placed before pressurization of rim bladder 20 for cure of the wheel 10, subsequently described. Outer rim hoop filament windings 24 similarly strengthen wheel 10. Hoop windings 23 between the spokes 12 are continuous with those at the spoke tips 17. (FIG. 3) The inflatable spoke mandrel 25 may, in accordance with alternate embodiments of wheel 10, remain within or be removed from finished wheel 10 after cure, as explained below.

Figure 12:
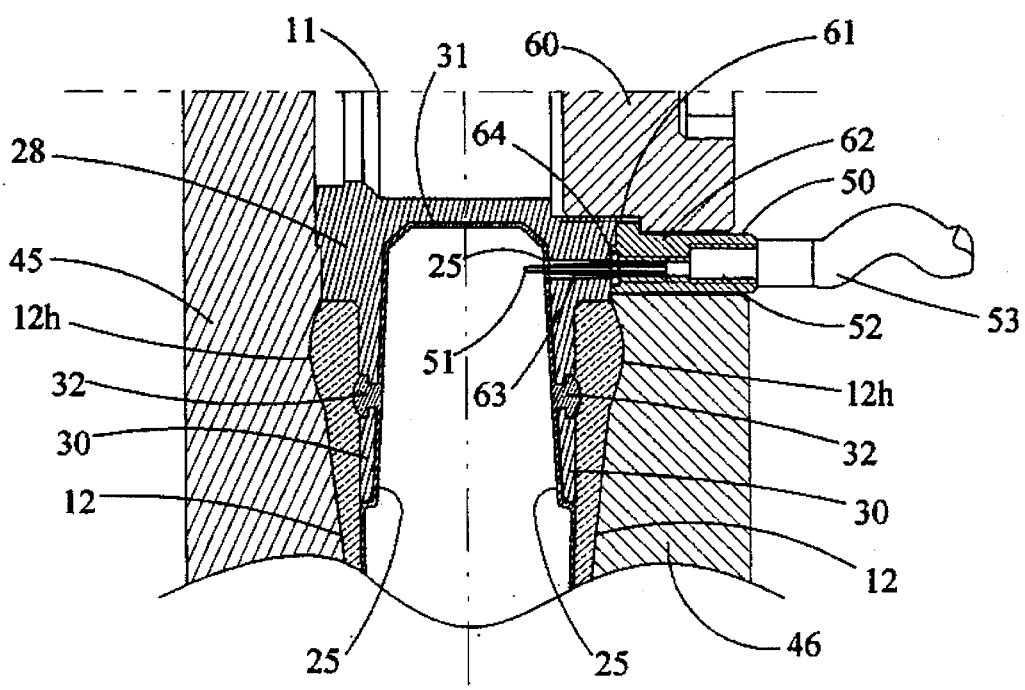

The inflatable spoke mandrel 25 of the invention can be made of silicon rubber, EPDM rubber, thermoplastic elastomers and other forms of thermoplastics. The preferred material for the illustrated embodiment is a blow moldable or roto-moldable thermoplastic, of Nylon, polypropylene or polyethylene. The inflatable mandrel material must be compatible with the composite materials curing temperatures, and must be rigid enough to withstand the filament winding forces which act upon it. However, the mandrel can be greatly stiffened by internal pressurization of up to 100 psi. during winding. Care must be taken in selecting the inflation pressure during winding so that the mandrel shape is not overly distorted and the mandrel is not near its rupture pressure. The individual spoke mandrels are inflated after assembly with hub 11. (FIG. 12) The wheel hub 11, described in more detail subsequently, has internal threads 61 accepting a threaded pressure plate retaining screw 60. The retaining screw 60 secures a pressure plate 62 which has four pressurization ports 63, one per individual spoke mandrel. The ports 63 have a threaded needle 51, as well as an "O" ring seal 64. When hub 11 and spoke mandrels 25 are assembled, a heated point of needle 51 is inserted into the plastic spoke mandrel 25. (FIG. 12) The retaining screw 60 is turned into the hub internal threads 61. Each spoke is pressurized and sealed in preparation for the winding operation.

The inflatable spoke mandrels are preferably identical, symmetrical blow molded parts, requiring a single production tool. The blow molded spoke mandrel is about 0.015 in. to 0.030 in. thick, common for plastic milk bottles and toys. The spoke mandrel does not have an air injection port for blow molding. A needle similar to part 51 (FIG. 12) may be employed for blow molding purposes.

Figure 4:
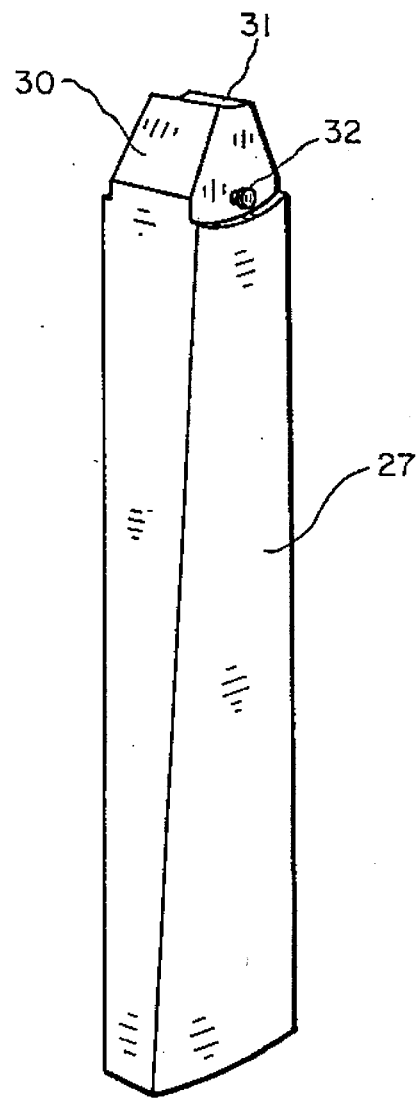
Figure 5:
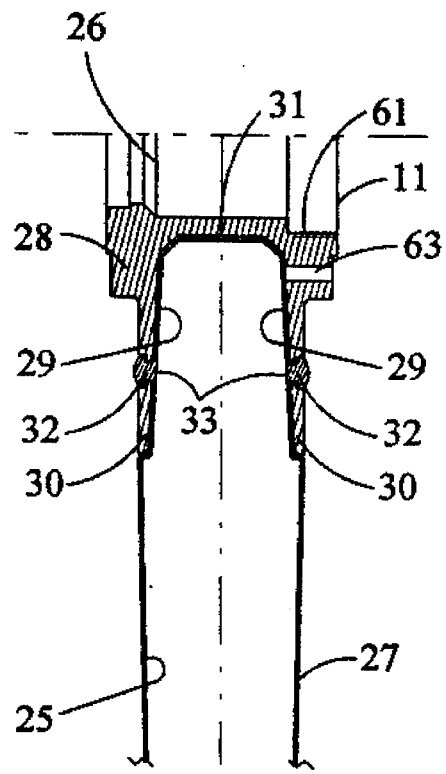
Figure 6:
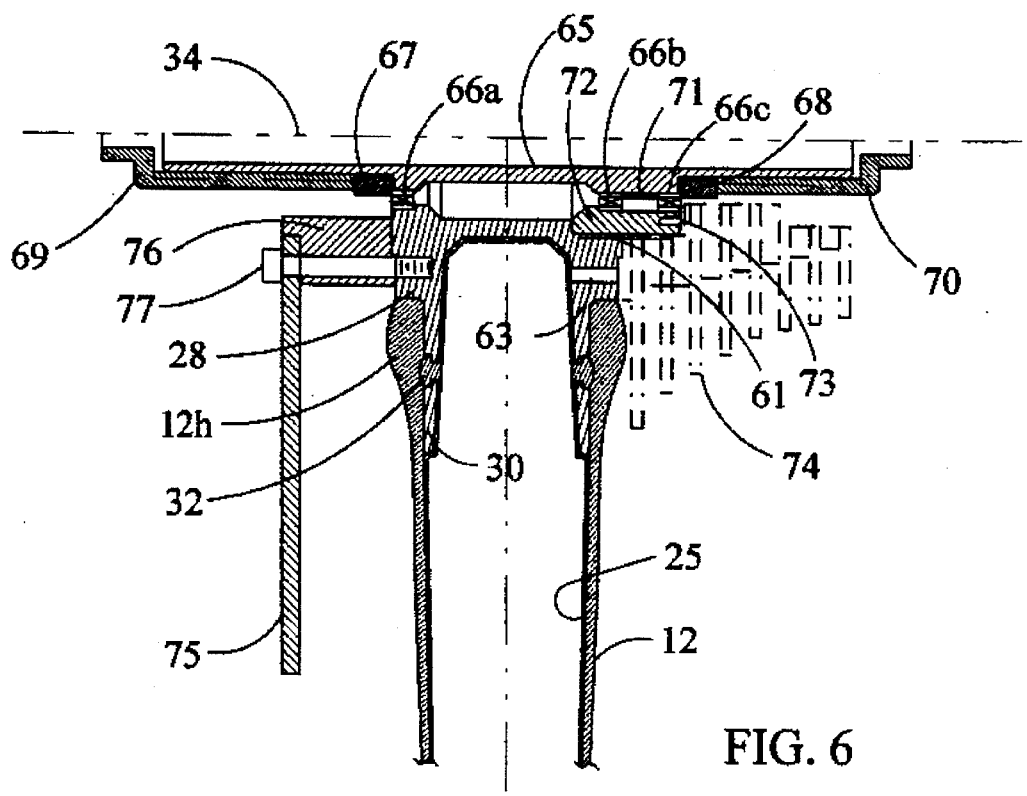

By utilizing inflatable spoke mandrels 25 with hub 11, a spoke-hub assembly 26 is created, to be filament wound for subsequent cure, along with the inner and outer rim components, into the final wheel assembly 10. Preferably, spoke-mandrel-hub assembly 26 comprises four individual inflatable spoke mandrels 25, shaped to be assembled together on hub 11, which carries flanges 30 extending from body 28. (FIGS. 4 & 5) The individual inflatable mandrels 25 may be adhesively bonded to each other and mating surfaces 29 on hub flanges 30 and to the hub itself at the arcuate ends 31. However, plastic stubs 32 are provided to snap into bores 33 in hub flanges 30. With this manner of assembly, bonding of the inflatable spoke mandrel parts together and to the hub are neither necessary. Removal of the inflatable spoke mandrel after filament winding is accomplished by deflating it and pulling it from the cured spoke-hub assembly. This approach is necessary for some embodiments of wheel assembly 10, requiring the removal of the inflatable mandrel after cure. An individual inflatable spoke mandrel 27 is shown in perspective in FIG. 4, with its hub end matching the interior surface geometry of hub 28, comprising flange mating surface 30 and arcuate end 31, which is also indicated in FIG. 5. In FIG. 6, a cross sectional view of the same hub 11 fragment is shown in conjunction with an axle and bearing assembly 34, for a rear wheel of a multi-geared bicycle. FIG. 6 also shows a fragment of one of the finished filament wound spokes 12 including filament winding built up thick portions 12h at the hub. The axle and bearing assembly 34 contains a high strength metal alloy axle 65, which is mounted to three ball bearing assemblies 66a, 66b and 66c, so that hub 11 is rotatably mounted to the axle 65. The axle 65 has a left spacer 67 and right spacer 68, providing space for mounting the wheel 10 upon a bicycle frame assembly, not shown. Such frame assemblies have mounting space requirements in the range of 125 mm to 160 mm for the rear wheel and, typically, 100 mm for the front wheel. Mounting of the wheel and establishing the spacing is accomplished through the interface of a left axle shaft stub shaft 69 and right axle stub shaft 70. Both axle stub shafts are threaded to the respective ends of axle 65. The right side of axle 65 has two bearings (66b, 66c) which are held apart by bearing spacer 71. These two bearings (66b, 66c) are press fit into a bore of the free wheel stud 72. The outer perimeter of the freewheel stud 72 is threaded into the main body of the wheel hub 28. Threading of the freewheel stud 72 is accomplished with a fixed face spanner wrench using spanner holes 73. The freewheel stud 72, when tightened into the wheel hub 28, bottoms out, such that a portion of its thread extends beyond hub 28 for acceptance of a threaded freewheel 74, which is commercially available. Freewheel 74 is for example found in an eight speed configuration manufactured by Sachs-Millard of France.

Hub 28 can be used to mount the wheel on the front of a bicycle by changing a few parts of the rear wheel assembly. Because of different spacing of left and right axle stubs 69 and 70, these components are replaced, as well as the axle stub shaft spacers 67 and 68; further the freewheel stud 72 is replaced with a front wheel stud, not shown, having only one bearing assembly 66b, which when tightened with a spanner wrench will be flush to the right side of wheel hub 28. Thus, the invention can accommodate various mounting applications. Further, the freewheel stud 72 can be configured to accept a cassette type freewheel assembly. Also, the left side of the hub 28 can have a brake disc 75 mounted in appropriate spacing with an adapter ring 76 by bolts 77.

Figure 16:
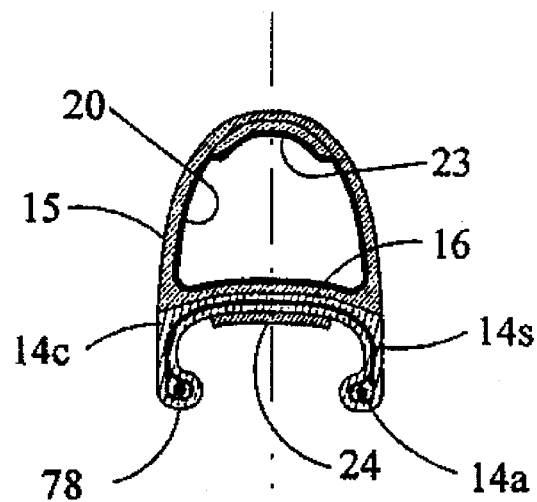

The use of disc brakes on bicycle applications is becoming increasingly popular among mountain and tandem bicycle users, to increase performance and to eliminate heating of the rims during high speed decelerations. The disc brake also allows a more simple wheel design not having metallic outer rim 14, as shown in FIG. 16, wherein a nonmetallic outer rim 14c is identical in shape to metal outer rim 14, but is of composite construction.

Composite rim 14c may be constructed of composite cloth, similarly to composite inner rim 15. The uncured composite outer rim 14c preferably is made from a triaxial braided sock 14s such as supplied from Atkins & Pearce, Covington, Ky. or New Port Composites, Inc., Santa Ana, Calif. (FIG. 16) Only a few axial fibers 14a would be required, oriented 180 deg. from one another in circular cross section of the braided sock. The axial fibers 14a build and reinforce the rim ridge 78 for retaining the tire bead. The triaxial braided sock is cut to an exact wheel circumferential length and is then wrapped into the mold cavity upon the outside surface of the inner rim 15. The inner rim outside surface 16 and the braided sock are in intimate contact.

Molding of the reinforcing ridge 78 is by use of a pad similar to pressure pad 55, but having the final molded reinforcement ridge shape. (FIG. 11) Such a pad may also be employed in the mold of the single piece composite rim illustrated in FIGS. 17 and 18. Other means of forming the reinforcement ridge are not beyond the scope of this invention.

Figure 7:
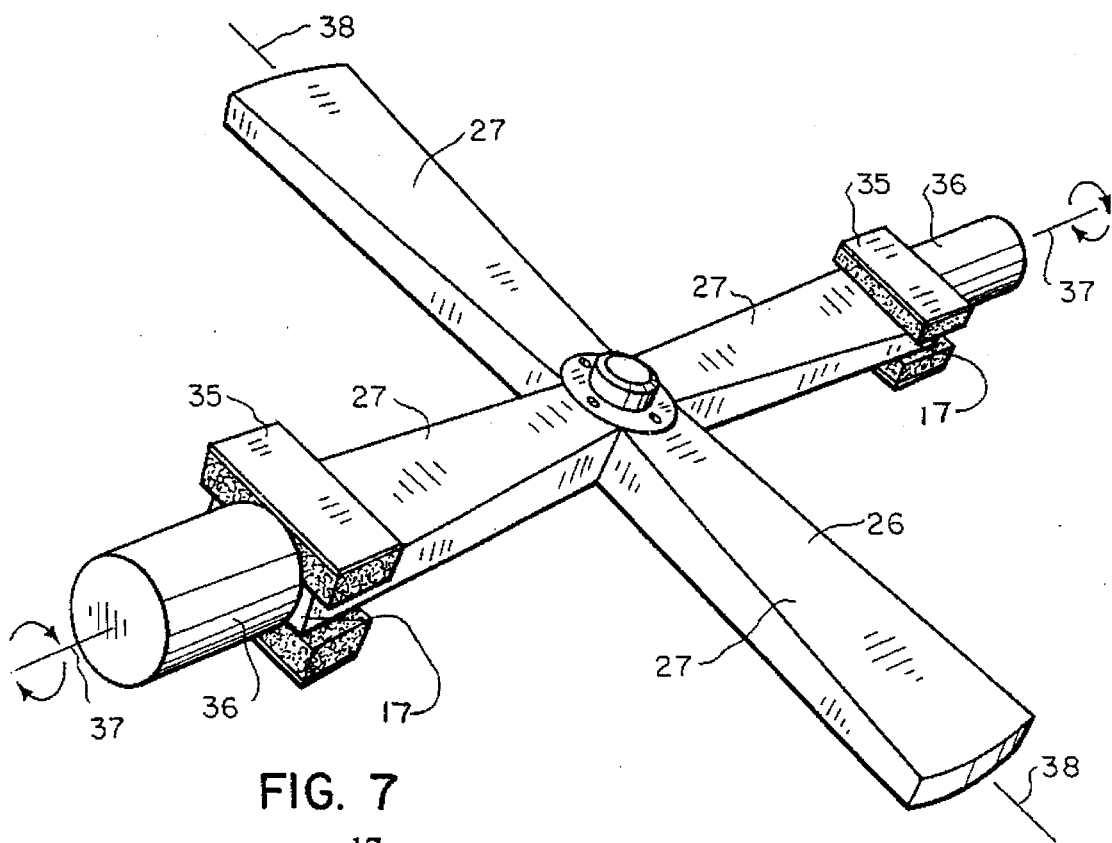
Figure 8:
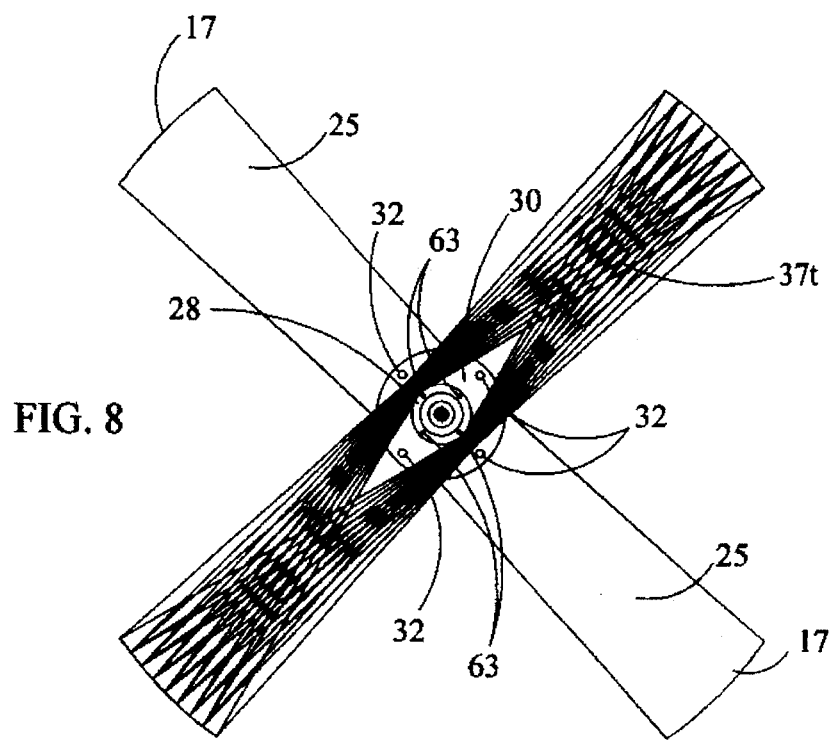
Figure 9:
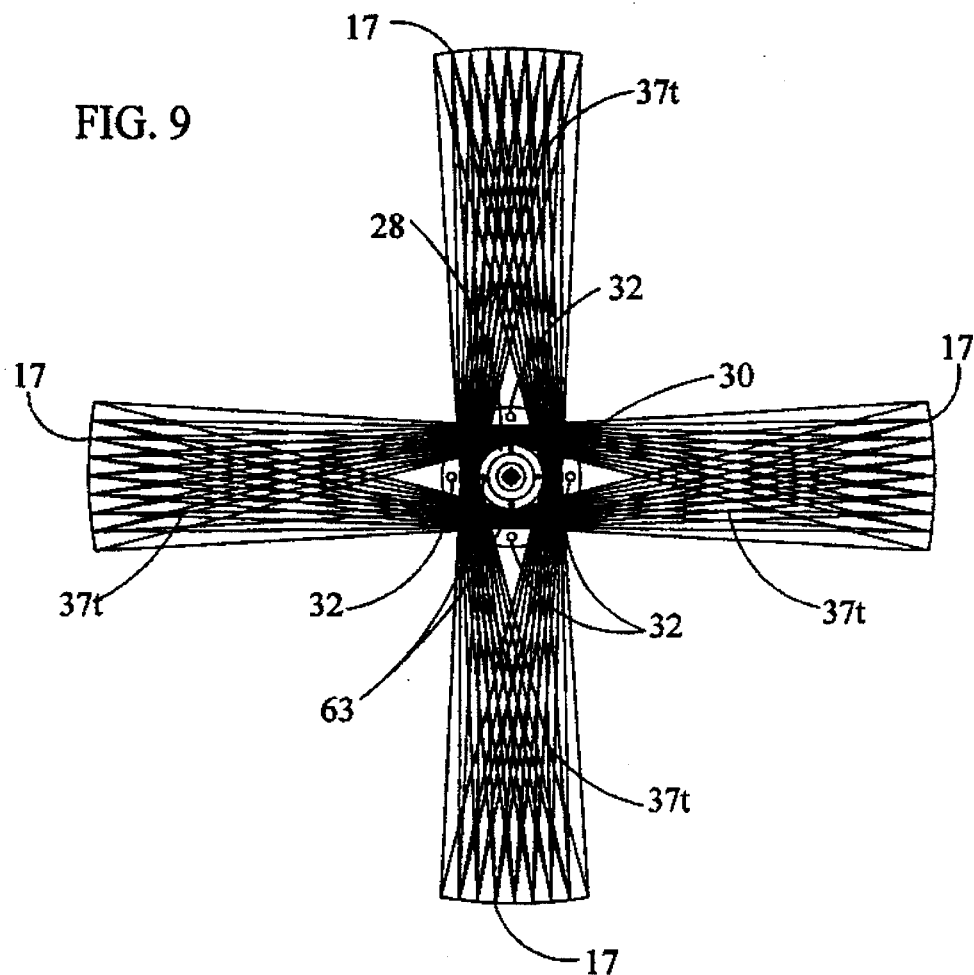

FIG. 7 indicates a machine setup for filament winding of the inflatable spoke mandrel-hub assembly 26. Soft clamps 35 act upon opposing spoke tips 17 to secure the spoke mandrel-hub assembly into a winding fixture, not shown. Inflatable mandrel assembly 26 is journaled through bearings 36 to rotate about a common longitudinal axis of symmetry 37 through one of the pairs of opposing inflatable spoke mandrels 27. Composite filament fiber 37t are wound continuously about the tips 17 and along the spokes 12, angled to cross at hub flanges 30. This winding pattern is indicated in FIG. 8, wherein filaments on both sides of the mandrel are shown, as if the mandrel were transparent. The thickness of the composite buildup of plies of filament wound fibers 37t is minimum at the spoke tips 17 and maximum upon the flanges 30 of hub body 28. A builtup section 12h is also shown in FIG. 6. However, the winding program can be manipulated to create what is known in the art of filament winding as an off-set winding pattern. This pattern lays down consecutive bands in a more side by side pattern instead of piled upon each other. After completion of the filament windings of FIG. 8, the mandrel hub assembly 26 is mounted to rotate about the axis of symmetry 38 of the remaining pair of spoke mandrels, adding to the aforesaid thickness buildup at the hub flanges. (FIG. 9)

Preferred fiber materials are carbon, Kevlar® S2-Glass and Spectra®, which all have excellent strength to weight ratios. Combinations of some or all may be used. The fibrous materials have a medium to high tensile modulus of between $20 \times 10^6$ psi to $75 \times 10^6$ psi, with tensile strength ranging from 420 KSI to 711 KSI. T700S carbon fiber from Toray Industries, Inc., (U.S. Marketing & Sales Office) Kirkland, Wash., or AS4 carbon fiber from Hercules Aerospace Company, Magna, Utah, manufactured from a polyacrylonitrite (PAN) precursor are suitable carbon fibers as is Kevlar®49, an aromatic polyamide fiber from DuPont Company, Wilmington, Del., and Spectra®, a polyethylene fiber from Allied Fibers, Petersburg, Va. A somewhat lower performance option is S-2 glass from OwensCorning Fiberglass Corp., Toledo, Ohio. The preferred fiber for the embodiment based on a strength, weight and cost standpoint are carbon fibers T700S and AS4.

The matrix material for the composite can be either a thermoset or a thermoplastic resin, with the preferred resin system being a thermosetting epoxy system of either bis-maleimides, bisphenols, and polyesters. Either a prepreg or wet winding based system may be employed. Such resins can be either room temperature curing or heat activated curing. A candidate epoxy wet winding resin system is the Tactix system from Dow Chemical, Freeport, Tex., or the 826 resin with a non-methylene dianiline (MDA) curing agent (which is a known carcinogen) from Shell Chemical Company, Houston, Tex. A typical 250° F. curing epoxy prepreg resin system is the 934 resin from Fiberite, an ICI Company, Winona, Minne.

Thermoplastic composite materials such as those offered by Baycomp, Burlington, Ontario, Canada and Polymer Composites, Inc., (PCI) Winona, Minne., are suitable. Baycomp and PCI have similar product lines such as carbon fiber (AS4 and T700S), Kevlar®49, E-glass and S2-glass fibers impregnated with such thermoplastic resins systems as Nylon 6, polycarbonate, polyethylene, polypropylene, polyetherimide and similar polymers. These thermoplastic composites are in various material forms ranging from short fibers less than ½ in. in length to continuous forms ⅛ in. to ¾ in. wide ribbon or 3 in. to 60 in. wide unidirectional tape. The preferred thermo-plastic material is the ribbon for the filament winding process and the unidirectional tape for the swatch reinforcements. The advantage of using the thermoplastic is that it is recyclable and reformable, and lends itself to potentially low cost manufacturing methods such as in situ filament winding, matched mold, diaphragm forming and internal pressure molding. All these methods in conjunction with the thermoplastic materials offer consolidation (cure) cycles orders of magnitude lower than thermosets. In particular, the in situ filament winding process is consolidated as the spokes and rim sections are filament wound, as known by those skilled in the art of in situ winding thermoplastic materials.

After filament winding, the last pair of spokes 12, a three-part female mold is prepared to accept the now composite-spoke mandrel-hub assembly 26 by first applying a Teflon based mold release agent such as Master MC-100, from Kindt-Collins Products, Cleveland, Ohio, to the mold cavity, then unidirectional or cloth swatches 18 are placed on spoke tip ends 17 extending to inner rim 15. Further reinforcements can be placed on the spoke tip 17 areas, such that about ½ the swatch 18 rests on the outer perimeter of the female mold half 46. (FIGS. 10 & 11) The composite spoke mandrel-hub assembly is then placed in the mold cavity. Additional reinforcements are added to the top half of the composite-spoke-hub assembly 26. The second mold half 46 is placed on top of the composite-spoke mandrel-hub assembly 26 and first mold half 46.

Figure 10:
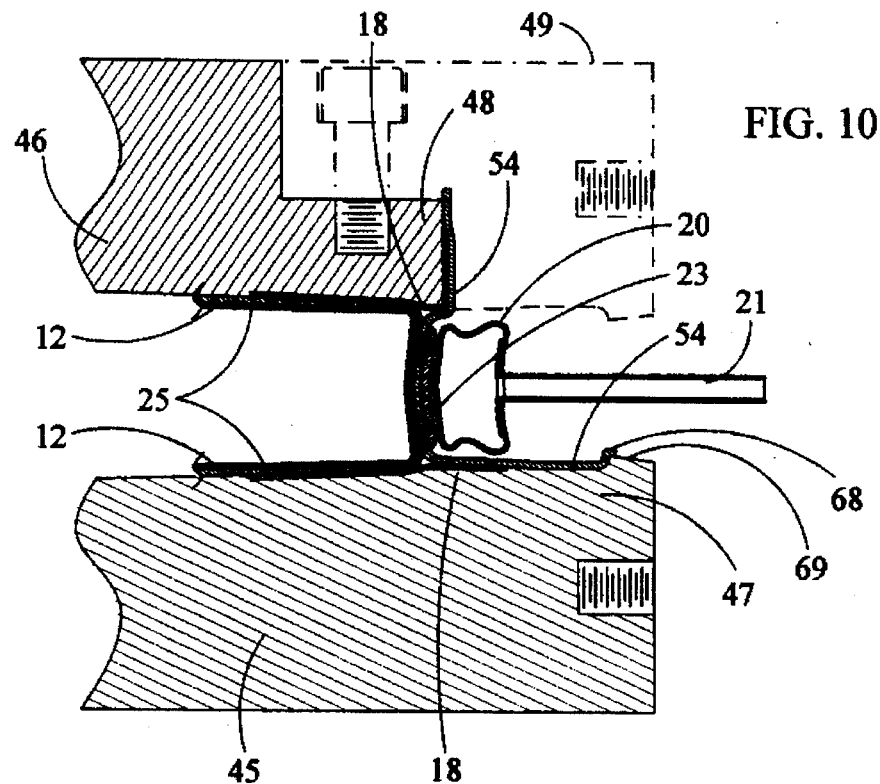

The female mold halves 46 provide an outwardly opening space between facing surfaces at the rim assembly location. A long strip 54 of biased cloth material is inserted all around the wheel to bear against the filament windings of the tips 17 of the spokes 12. For installation of strip 54, annular portion 49 may be removed as shown in FIG. 10, or left in place, as indicated by the dashed lines in the same figure. In either event, outer edges of the cloth 54 are secured to the mold faces 47 and 48 with an adhesive tape, not shown, or a resin tackifier, such that the edges will not fold inwardly during subsequent winding operations. Between spokes, the mold faces are contoured to provide the inner rim contours of FIG. 3. Next, the mold is placed into a rotating fixture, not shown, and hoop windings 23 applied over the cloth 54.

Figure 11:
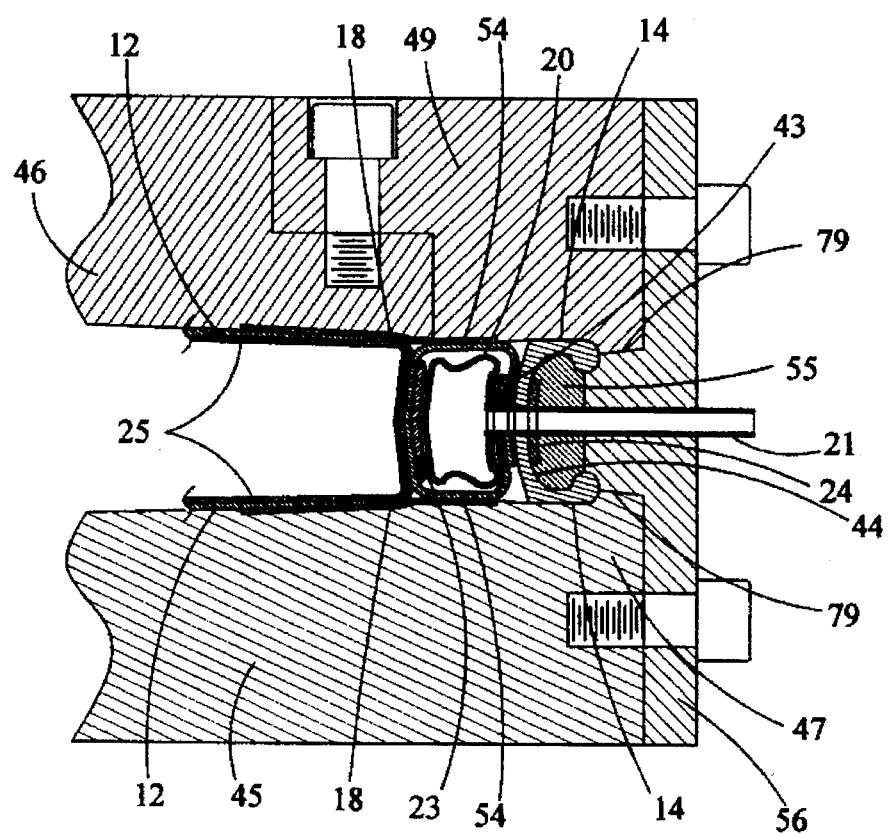

A 0.002 to 0.010 inch thick toroidal rim bladder 20 of Nylon or the like, with an inflation stem 21, is then placed on top of cloth 54 upon the hoop windings 23. If necessary, mold part 49 may also be temporarily removed for placement of this bladder. As indicated in FIG. 11, the composite cloth 54 is then folded to overlap around the bladder 20. With mold part 49 removed, metallic outer rim 14 is installed by lateral movement to a position about the folded overlapping cloth strip 54, and held in place by small lip 79 on mold sides 47 and 48. (FIG. 11) Metal rim 14 may be in two parts, not illustrated, such that the left and right metallic braking surfaces are provided with inner rim to outer rim interfaces. After replacement of mold part 49, securing metal rim 14, the molds are placed into a fixture, not shown, for rotation to apply the hoop windings 24 to bear against the outwardly facing surface of the bottom member 22 of metallic rim 14 (FIG. 11) or its two part metallic counterpart.

A two piece segmented toroidal pressure blocking plug 55, preferably of silicone rubber or other elastomeric material with a high coefficient of expansion, is installed within outer rim 14, as is two piece segmented metallic hoop mold 56, the latter secured to the female mold parts. Hoop mold 56 precludes outward deflection of metallic rim 14 during pressurization and cure.

Utilizing bladder stem 21 and needle 51, internal pressure is applied to rim bladder 20 and spoke mandrel assembly 25, forcing composite cloth 54 and the composite filament windings of spokes 12 into gap-filling contact with the inner surfaces of the female molds. The fibers are thus prestressed prior to the resin matrix taking a permanent set (in the case of the epoxy matrix composites) or the thermoplastic resin solidifying for ambient operation. After cure, the final rim structure at the spokes and therebetween assumes the shapes of FIGS. 2 & 3.

To construct the rim embodiment illustrated in FIG. 16, the metallic outer rim 14 is replaced in the process by an uncured composite cloth version 14c, which is emplaced within the mold halves, preferably with the blocking plug 55 again being used. Preferably, composite outer rim 14c comprises an uncured triaxial sock 14s.

Figure 17:
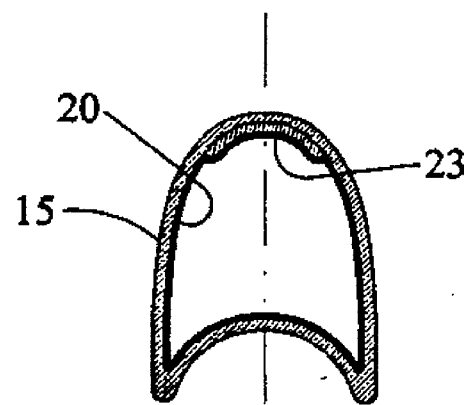
Figure 18:
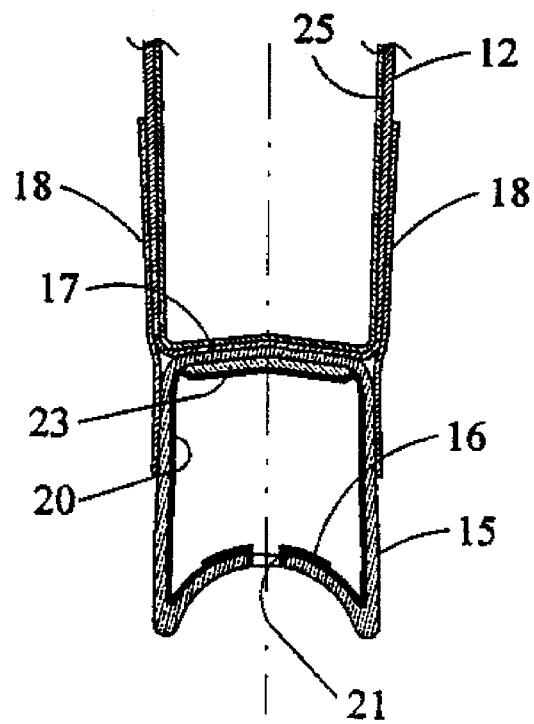

The monostructure composite rim 15 shown in FIGS. 17 and 18 is constructed by the same general methods described for the composite inner rim structure 15, with cloth strip 54 being extended to comprise the single rim structure 13, a bladder of correspondingly increased size also being provided and used.

Figure 13:
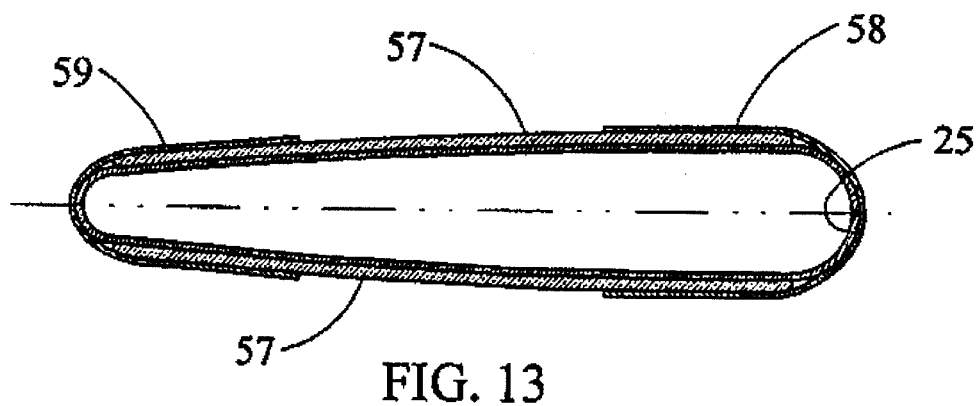
Figure 14:
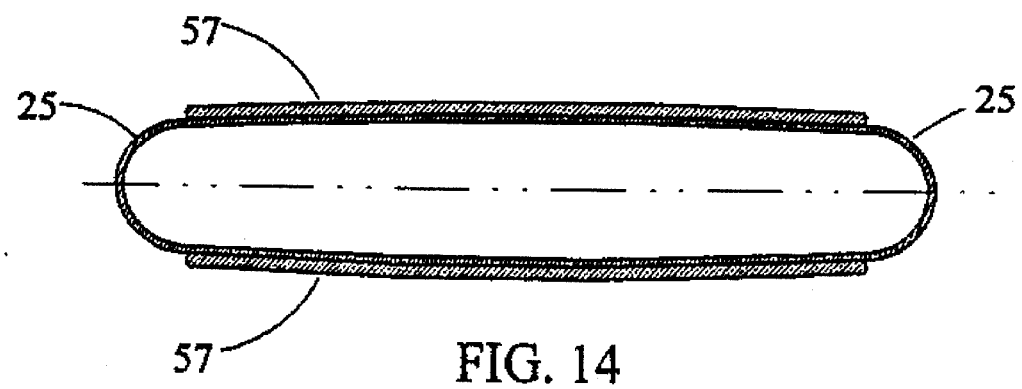
Figure 15:
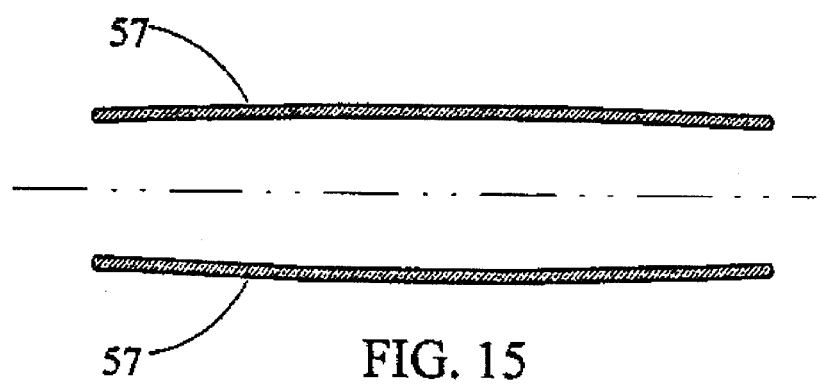

By proper contouring of the faces 47 and 48 of female mold halves 46, the surface shape of the spokes 12 shown in FIGS. 13–15 may be selected for aerodynamic performance, or for improved structural strength. In this manner, considerable selection in spoke cross section shape may be provided for use in various present and future bicycle wheel applications. A tapered air foil shape is illustrated in FIG. 13, spoke walls 57 being cured to converge rearwardly. In the option shown in FIG. 14, the spoke walls remain substantially parallel. The two spoke contour options shown in FIGS. 13 and 14 are similar in that the spoke mandrel 25 remains with the finished product in each case, and the leading and trailing edges may have composite swatches 58 and 59, as seen in FIG. 13. With the option shown in FIG. 15, the spoke walls are essentially parallel and the spoke mandrel 25 is removed. In this instance, walls 57 create only knife-edge surfaces for reduced resistance to wheel rotation through the air.

The inner and outer separate composite rims may be replaced by a single composite structure, such as seen in FIGS. 17 and 18.

Other variations within the spirit of the invention may be employed in its actualization. Therefore, the apparatus and methods described and shown are illustrative only and not restrictive, and all embodiments and construction methods, and all equivalents thereof, put forth in the claims are intended to be embraced therein.

What is claimed and desired to be secured by United States Letters Patent is:

1. A bicycle wheel comprising:

a generally circular central hub having a body carrying an axial bore for receiving an axle and bearing assembly;

a circular rim structure concentric with the hub, for receiving a tire on the outermost circumference thereof;

a multiplicity of elongate spoke structures, each having an outermost tip at the rim structure and an innermost end at the hub and each extending radially outwardly from the hub, with the tip thereof abutting the rim structure;

means securing the inner end of each of the spoke structures to the hub; and means securing the outermost tips of each of the spoke structures to the rim structure; wherein the body of the hub includes a portion at each end thereof extending radially outwardly from the hub, said portion having an outwardly facing generally planar surface;

each spoke structure comprises a pair of spaced apart spoke side members, each of said side members extending from an associated outside hub body surface to join with the spoke structure tip;

the multiplicity of spoke structures comprises radially opposite pairs of the spoke structures, the spoke structures of each of said pairs extending oppositely from the hub aligned with each other along a diameter of the wheel; and wherein each pair of opposing spoke structures comprises fiber filaments continuous at least from tip to opposing tip placed radially to the wheel from spoke side members to diametrically opposing spoke side members across the associated intervening outwardly facing hub body planar surface.

2. The bicycle wheel of claim 1, comprising:

two of the pairs of radially opposite spoke structures, said pairs being perpendicular to each other; wherein the substantially continuous fiber filaments of one of the pairs lay across and upon corresponding fibers of the other pair at the hub body planar surfaces.

3. The bicycle wheel of claim 2, wherein the wheel rim structure comprises:

a circular hollow structure continuous around the wheel, comprising composite fiber-resin material, having an inwardly facing innermost surface shaped to match the tips of the spoke structure and abutting and bonded thereto; and an outermost side configured for receiving a tire thereon around the wheel.

4. The bicycle wheel of claim 3, wherein the hollow rim structure includes an innermost wall with an outwardly facing surface, the wheel further comprising:

continuous filament hoop windings about and upon said outwardly facing surface all around the wheel.

5. The bicycle wheel of claim 3, further comprising:

a pair of swatches of composite fiber-resin cloth, each being bonded to a laterally facing outside surface of each spoke structure, and to an adjacent laterally facing outside surface of the composite wheel rim structure.

6. The bicycle wheel of claim 3, wherein:

the rim structure comprises aerodynamically shaped portions between the spoke tips.

7. The bicycle wheel of claim 6, wherein:

the spaces between the spaced apart side members of each pair of spoke structures are open so that passage of air therebetween is unobstructed.

8. The bicycle wheel of claim 6, therein:

the side members of each pair of spoke structures are joined at leading and trailing edges by strips of composite fiber resin cloth bonded to each side member and formed convexly outwardly therefrom.

9. The bicycle wheel of claim 2, wherein the wheel rim structure comprises:

a circular inner rim hollow structure continuous around the wheel, comprising composite fiber-resin material, having an inwardly facing surface abutting and bonded to the tips of the spoke structure, and a radially outermost surface;

a circular outer rim structure of metallic material continuous all around the wheel, for receiving a tire at its outermost circumferential portion, having a radially innermost surface abutting and bonded to the radially outermost surface of the inner rim structure all around the wheel.

10. The bicycle wheel of claim 9, further comprising:

continuous filament hoop windings about and upon the inside of a radially innermost wall of the inner rim composite structure all around the wheel.

11. The bicycle wheel of claim 10, further comprising:

continuous filament hoop windings about and upon an outwardly facing side of a radially innermost wall of the metallic outer rim structure.

12. The bicycle wheel of claim 11, further comprising:

a swatch of composite fiber resin cloth at both sides of each spoke structure, being bonded to associated outermost surfaces of spoke members and to associated outside surfaces of the composite inner rim structure.

13. The bicycle wheel of claim 11, wherein:

the spaces between the spaced apart side members of each pair of side members are open so that passage of air therebetween is unobstructed.

14. The bicycle wheel of claim 11, wherein:

The side members of each pair of side members are joined at opposite edges by strips of composite fiber resin cloth bonded to each side member and formed outwardly convexed therefrom.

15. The bicycle wheel of claim 9, further comprising:

a swatch of composite fiber resin cloth at both sides of each spoke structure, being bonded to associated outermost surfaces of spoke members and to associated outside surfaces of the composite inner rim structure.

16. The bicycle wheel of claim 9, wherein:

the inner rim structure comprises portions shaped at the spoke tips to have radially innermost surfaces matching outermost surfaces of said tips; and aerodynamically shaped portions between the spoke tips.

17. The bicycle wheel of claim 16, wherein:

the spaces between the spaced apart side members of each pair of side members are open so that passage of air therebetween is unobstructed.

18. The bicycle wheel of claim 16, wherein:

The side members of each pair of side members are joined at opposite edges by strips of composite fiber resin cloth bonded to each side member and formed outwardly convexed therefrom.

19. The bicycle wheel of claim 2, wherein the wheel rim structure comprises:

a circular inner rim hollow structure continuous around the wheel, comprising composite fiber-resin material, having an inside surface abutting and bonded to the tips of the spoke structure, and a radially outermost surface;

a circular outer rim structure of composite material continuous all around the wheel, having a radially innermost surface abutting and bonded to the radially outermost surface of the inner rim structure all around the wheel; wherein the outer rim composite structure has a pair of opposed inwardly projected portions shaped to grip outwardly projecting beads of a tire to retain said tire upon the wheel.

20. The bicycle wheel of claim 19, wherein:

the composite outer rim structure comprises a triaxial braided sock radially folded before cure to provide a cross sectional configuration for receiving a tire.

21. The bicycle wheel of claim 19, wherein:

the composite outer rim structure comprises composite cloth.

22. The bicycle wheel of claim 19, further comprising:

continuous filament hoop windings about and upon the outwardly facing side of a radially innermost wall of the inner rim composite structure all around the wheel; and continuous filament hoop windings about and upon the outwardly facing side of a radially innermost wall of the composite outer rim structure.

23. The bicycle wheel of claim 19, further comprising:

a pair of swatches of composite fiber resin cloth, each bonded to a laterally facing outside surface of each spoke structure, and to an adjacent laterally facing outside surface of the composite inner rim structure and the composite outer rim structure.

24. The bicycle wheel of claim 19, wherein:

the inner rim structure comprises aerodynamically shaped portions between the spoke tips.

25. The bicycle wheel of claim 24, wherein:

the spaces between the spaced apart side members of each pair of side members are open so that passage of air therebetween is unobstructed.

26. The bicycle wheel of claim 24, wherein:

the side members of each pair of side members are joined at leading and trailing edges by strips of composite fiber resin cloth bonded to each side member and formed convexly outwardly therefrom.

27. The bicycle wheel of claim 1, wherein:

the spaces between the spaced apart side members of each pair of side members are open so that passage of air therebetween is unobstructed.

28. The bicycle wheel of claim 1, wherein:

The side members of each pair of side members are joined at opposite edges by strips of composite fiber resin cloth bonded to each side member and formed outwardly convexed therefrom.

29. The bicycle wheel of claim 1, wherein:

the continuous fiber filaments extend across the tips and along opposite side members of the spoke structures and across opposite associated hub body planar surfaces.

* * * * *